Nov. 5, 1929.　　　　J. A. STRUM　　　　1,734,835
METHOD OF BUILDING TIRE CARCASSES
Filed Oct. 8, 1927　　2 Sheets-Sheet 1
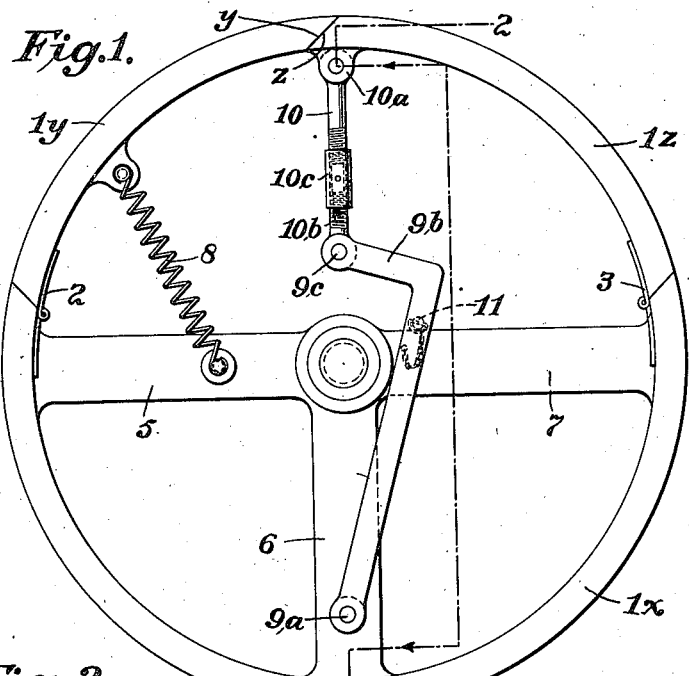
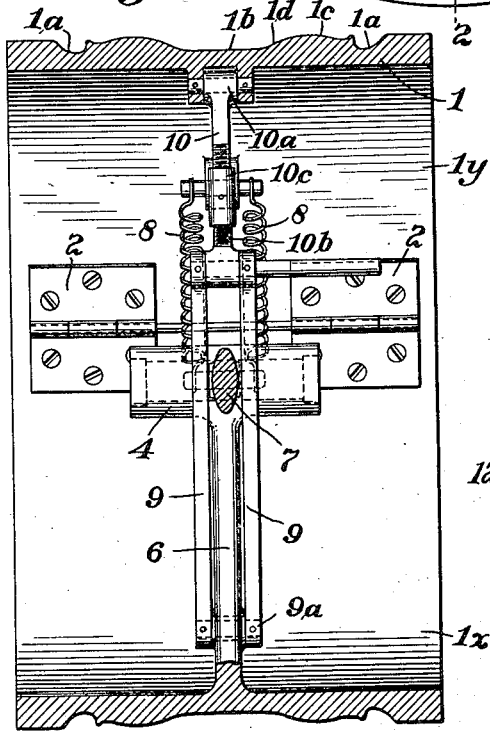
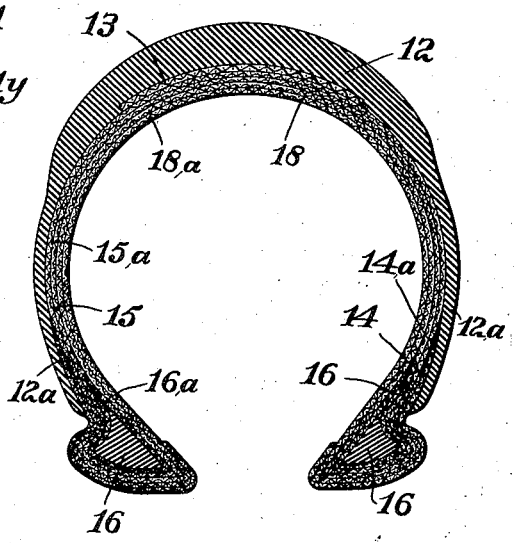
Inventor:
James A. Strum,
by Spear Middleton Donaldson & Hall
Attys.

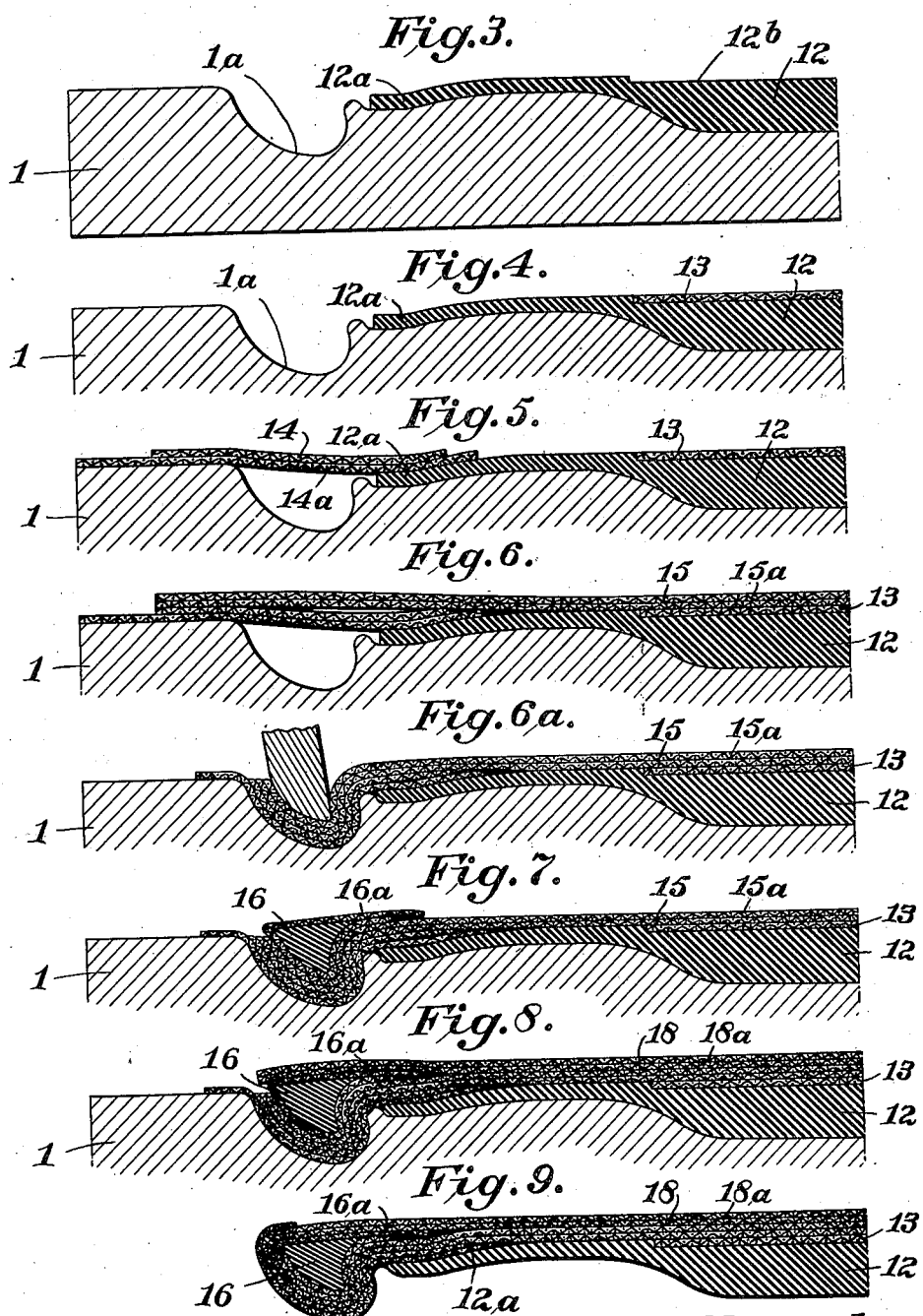

Patented Nov. 5, 1929

1,734,835

UNITED STATES PATENT OFFICE

JAMES A. STRUM, OF WATERTOWN, MASSACHUSETTS

METHOD OF BUILDING TIRE CARCASSES

Application filed October 8, 1927. Serial No. 224,953.

My present invention relates to an improved method of building tire carcasses for open bellied pneumatic tires.

Heretofore it has been proposed to build such tires in flat or what has been known as pulley band form, either in whole or in part, by two general methods, one being to wind the carcass forming layers on a mandrel, with the layers in the same order which they will occupy in the finished tire, and the other to wind them on the mandrel or drum so that the tire is built in inverted position, it being thereafter removed from the mandrel and turned inside out. In both cases the pulley band structure is afterwards shaped to tire form by pressing or expanding its central portion, whereafter it is placed in a suitable mold and vulcanized, usually by the use of an air bag by which the tire is held in contact with the mold surface during vulcanization, as is well known to those skilled in the art.

The present invention aims to provide a process which will be simpler than anything of which I am aware, and capable of being expeditiously performed.

The invention further aims to provide a method by which the successive layer strips or parts of which the tire is built up can be accurately guided to the drum without the aid of complicated mechanism, thereby saving in cost and machinery, the method enabling an operator to produce a large number of accurately formed carcasses in a given time entirely by hand manipulation.

With these and other objects in view, which will hereinafter appear, the invention includes the novel method hereinafter described, the nature and scope of the invention being defined by the claims appended hereto.

In order that my invention may be more readily understood, reference is made to the accompanying drawings, in which:—

Figure 1 is a side elevation of a drum or mandrel designed for carrying out my improved method.

Fig. 2 is a transverse vertical section of the same on line 2—2.

Fig. 3 is a sectional detail of one side of the drum illustrating the application of the combined tread and side wall forming layer to the drum.

Fig. 4 is a similar view, showing the application of the combined top cover and breaker strip.

Fig. 5 is a view showing the application of the chafing strips.

Fig. 6 is a view showing the application of the succeeding layers of carcass forming fabric.

Fig. 6ª is a view showing how the chafing strips and carcass forming fabric is pressed down into the bead channel for the reception of the bead strips.

Fig. 7 is a view showing the application of the bead cores.

Fig. 8 is a view showing the application of the succeeding carcass forming fabric layers.

Fig. 9 is a view showing the carcass with the parts in the position ready to be removed from the mandrel and inverted and shaped to tire form.

Fig. 10 is a sectional view of the combined tire, it being understood that all of the views, Figs. 2 to 10, are made of a conventional or somewhat diagramamtic nature for purposes of illustration.

In proceeding according to my invention I provide a collapsible drum indicated at 1, of substantially cylindrical form, having a surface shaped to the contour of the exterior face of the desired tire when the same is in its flat or substantially pulley band shape, or unexpanded condition. This drum is made with an exterior surface of smooth polished metal, preferably aluminum, for a purpose which will hereinafter appear, and is provided with two circumferential grooves $1^a$, spaced equidistantly from the side edges of the drum, which grooves are shaped to correspond to the exterior beaded edges of the tire. The portion of the surface of the drum lying between these grooves or channels is machined to correspond to the contour of the exterior surface of the tire when in flat form, being provided with a central relatively wide and shallow channel $1^b$ for receiving the tread portion of the tire, and intermediate portions of less reduction $1^c$ corresponding to the side wall covering, there being also, if desired, an intermediate stepped portion 1ᵈ for forming a corresponding "step" at each side or edge of the tread portion where this is desired. It will be understood, however, that the precise profile of the drum may be varied according to the configuration or contour of the tire desired.

The drum shown in Figs. 1 and 2 is one which I have found convenient for my purposes, the same comprising a main section 1ˣ and two hinged or collapsible sections 1ʸ and 1ᶻ connected to the main section by hinges 2 and 3. The main section 1ˣ is carried by a suitable hub 4 through the intermediary of spokes or arms 5, 6 and 7, which hub may be mounted upon a suitable shaft, not shown, supported by any convenient form of stand, and may be driven by power or rotated by hand as found most convenient.

The section 1ʸ may be connected to the spoke arm 5 by a spring 8 tending to draw the same inwardly and the section 1ᶻ is provided with means by which it may be swung inwardly or forced outwardly. The juxtaposed free ends of the sections 1ʸ and 1ᶻ are beveled to overlap each other so that when the section 1ᶻ is swung inwardly section 1ʸ will automatically follow, while when the section 1ᶻ is forced outwardly it will push the free end of section 1ʸ outwardly until the ends are brought into abutting relation, as shown in Fig. 1, when the drum is ready for the carcass building action.

A very convenient means for swinging the section 1ᶻ in and out is to provide toggle joint mechanism comprising a link member 9 having one end pivotally connected to the spoke 6, as indicated at 9ᵃ and extending therefrom to one side of the hub, the other end being angularly turned, as indicated at 9ᵇ and having pivotally connected thereto at 9ᶜ a link member 10, the outer end of which is pivotally connected to the section 1ᶻ at 10ᵃ. Preferably the link 10 is made adjustable lengthwise, which may be accomplished by making it in two parts indicated at 10 and 10ᵇ respectively, the adjacent portions of these parts being reversely threaded and connected by a turnbuckle 10ᶜ.

Preferably the link mechanism 9 is made of twin form so as to provide two link members lying on opposite sides of the spokes, as shown in Fig. 2, and the same is held in locked position to hold the members 1ʸ and 1ᶻ in drum form by means of a pin 11 passing through aligning opening in the link members 9 and adapted to abut against one edge of spoke member 7, as shown in Fig. 1. Pivot pin 9ᶜ is extended at one side to serve as a handle, as shown in Fig. 2.

Given a drum as above described, the first step in the formation of the tire is to apply thereto the thread and side wall forming strip, to wit, the rubber which forms the outer covering for the thread surface and side walls of the tire. This strip is shown at 12, Fig. 3, and comprises a relatively thick central tread forming portion and relatively thin side portions 12ᵃ, which form the side wall coverings. The central portion is provided with a relatively wide and shallow channel 12ᵇ which serves to receive the fabric reinforcement which is customarily applied directly beneath the tread, which fabric reinforcement will be referred to in detail hereinafter. This tread and side wall strip may be formed in any suitable manner conveniently by the use of a tubing machine having a shape in cross section to produce a strip of the desired shape. The central groove 1ᵇ in the drum serves as a guide for properly positioning the strip 12 as it is fed to and wound on the drum, and this may be easily accomplished by the operator without the necessity of any mechanical guiding means.

After a convolution of tread and side wall covering material has been applied to the drum, as indicated in Fig. 3, the ends are joined together to form an endless belt which is done by pressing the juxtaposed ends together whereby they are caused to adhere by reason of the sticky nature of the unvulcanized material. The tread and side wall covering strips may be in the form of strips previously cut to the desired length, or may be severed from a longer strip after a sufficient portion thereof has been wound on the drum, the strips being cut of such length as to afford ample material to enable the ends to be pressed together. After the strip 12 has been wound on the drum, as shown in Fig. 3, I apply a reinforcing fabric layer, or layers, which may be in the shape of a combination top cover and breaker strip, indicated at 13, Fig. 4. This strip is of a width and thickness to exactly fill the wide shallow channel 12ᵇ above referred to, and this channel serves as a guide to the operator in feeding the strip or strips 13, whereby he is enabled to accurately apply the side strip to the exposed edges of the tread without mechanical guiding means.

The next step in the method is to apply the chafing strips. To do this I provide previously assembled semi-final and final chafing strips designated 14 and 14ᵃ respectively, which are assembled in overlapping relation, the final chafing strip 14ᵃ being wider than the semi-final strip so that it projects beyond the corresponding edge of the semi-final strip on the side away from the center of the tire.

While in the preceding description I have referred to only one pair of chafing strips, it will be understood, especially in connection with Fig. 5, that two pairs of strips are applied, one adjacent each end of the drum.

The layer dimensions of the semi-final and final chafing strips are such that when the assembled strips are wound on the drum, if the outside edge of the final chafing strip is wound so as to coincide with the edge of the drum, the corresponding outside edge of the semi-final chafing strip will be in a position to serve as a guide for the first band of the tire forming fabric, as hereinafter described, while, as will be readily apparent, the edge of the drum serves as a guide for the proper positioning of the chafing strips. After the breaker strip 13 and chafing strips have been applied, they are rolled down, and as the chafing strips overlap the side wall cover portions 12ª they adhere thereto by reason of the tacky nature of the material. The rolling down may be done by the use of a suitable hand roller, or by any other suitable means. After this rolling action I next apply one or more layers of carcass forming fabric which are adapted to cooperate in forming the body of the tire, and which are of a width to extend from the outside edge of one semi-final strip across to the corresponding outside edge of the other semi-final chafing strip. Two such layers of carcass forming fabric are indicated at 15 and 15ª in Fig. 6, and it will be seen that the first strip 15 may be accurately guided by the operator into proper position as the outside edges of the semi-final chafing strips 14 serve as a guide for positioning the strip or band 15, and of course, such edges coupled with the edges of the band 15, serve as a guide for the positioning of the band 15ª.

After the strips or bands 15 and 15ª have been applied, they are likewise rolled down, and due to the fact that after the tread strip and breaker strips 13 have been applied the surface exposed is substantially cylindrical, the rolling down action of the subsequent strips may be readily accomplished, it being understood that the roller which is used would be one of sufficient width to bridge the bead channels.

After having applied the chafing and carcass forming strips, I press the portions overlying the bead grooves down into said bead grooves, as shown in Fig. 6ª, which may be readily accomplished by the use of a hand roller (shown conventionally at 17), having a periphery corresponding substantially to the cross section of the bead groove, whereafter the bead strips 16 with their flipper strips 16ª are applied to the channels thus formed, and by which they are accurately positioned. It will be observed that as the chafing strips and overlying portions of the carcass strips are forced down into the groove, the outside margins are drawn towards the center of the drum, this sliding action being permitted by reason of the fact that the outside margin of each final chafing strip rests on the polished surface of the drum, while its inside margin is held against lateral movement by being tied to the tread and carcass forming strips. When the side chafing strips and corresponding portions of the carcass forming strips have been forced down into the grooves, the outside edges of the semi-final chafing strip and the carcass forming strips are drawn into juxtaposition or substantial alignment with the outer edges of the bead grooves so as to be coincident with the toe of the bead, as shown in Fig. 7, while the outside margin of the final chafing strip still rests upon the surface of the drum, though having been drawn inward thereon, as shown in said Fig. 7. Thereafter a final layer or layers of carcass forming fabric, indicated at 18 and 18ª, are applied and rolled down, the toes of the beads forming a guide for the operator in positioning these strips (see Fig. 9), and the projecting edge or margin of the final chafing strip is then turned over and rolled down upon the margin of the strip 18ª, whereupon the carcass is complete and ready for removal from the drum. This may be readily effected by collapsing the drum.

After removal, the band is turned inside out and may be pressed or shaped to tire form by any suitable expanding means, whereafter it is placed in a mold and vulcanized, preferably by the use of an air bag.

As the steps of expanding to tire form and vulcanizing are well known to those skilled in the art, more detailed description thereof is deemed unncessary, it being thought that the invention will be fully understood from the foregoing in connection with the showing in Fig. 10, of the carcass after it has been shaped to tire form.

Having thus described my invention, what I claim is:—

1. In a method of building a tire carcass in substantially pulley band form, the steps of applying a tread band to a substantially cylindrical drum of greater width than the tread band, assembling chafing strips in stepped pairs, and applying said chafing strips in overlapping relation to the tread band and with the outside edge of the underlying chafing strip of each pair adjacent the corresponding edge of the drum whereby the drum edge serves as a guide in the applying of the chafing strips.

2. In a method of building a tire carcass in substantially pulley band form, the steps of applying a tread band to a substantially cylindrical drum of greater width than the tread band, assembling chafing strips in stepped pairs, and applying said chafing strips in overlapping relation to the tread band and with the outside edge of the underlying chafing strip of each pair adjacent the corresponding edge of the drum, whereby the drum edge serves as a guide in the applying of the chafing strips, and thereafter applying a carcass band or bands with their edges aligned with the outside edges of the overlying chafing strips, whereby said outside edges form guides for positioning the carcass bands.

3. A method of building a pneumatic tire carcass in inverted pulley band form, which consists in applying to a drum having a central tread receiving channel and bead grooves on each side thereof, a combined tread and side wall strip to occupy the space between said grooves, applying side chafing strips to the margins of the drum, and in overlapping relation to the side wall portions of said first named strip, applying one or more carcass forming strips over said first named strip and chafing strips, pressing said chafing strips into the bead receiving grooves, applying bead rings to said grooves, and thereafter applying one or more additional carcass forming strips over the aforesaid carcass and bead cores.

4. A method of building a pneumatic tire carcass in inverted pulley band form, which consists in applying to a drum having a central tread receiving channel and bead grooves on each side thereof, a combined tread and side wall strip to occupy the space between said grooves, applying side chafing strips to the margins of the drum in stepped pairs with the outside edges of the underlying strips flush with the edges of the drum and the inner margins of the strips overlying the side wall portions of the combined tread and side wall strip, applying one or more carcass strips over said combined tread and side wall strip and said chafing strips, pressing the carcass and chafing strips into the bead grooves, applying bead cores to said grooves, applying one or more carcass strips over the preceding carcass strips and bead cores, and thereafter turning the projecting margins of said underlying chafing strips over the edges of the last mentioned carcass strips.

In testimony whereof, I affix my signature.

JAMES A. STRUM.